(12) United States Patent
Gao et al.

(10) Patent No.: US 7,761,468 B2
(45) Date of Patent: Jul. 20, 2010

(54) SUPPORTING MULTIPLE SECURITY MECHANISMS IN A DATABASE DRIVER

(75) Inventors: Huaxin Gao, San Jose, CA (US); Bilung Lee, Fremont, CA (US); Paul A. Ostler, San Fancisco, CA (US)

(73) Assignee: International Business Machines Corporation, Armonk, NY (US)

( * ) Notice: Subject to any disclaimer, the term of this patent is extended or adjusted under 35 U.S.C. 154(b) by 59 days.

(21) Appl. No.: 11/538,518

(22) Filed: Oct. 4, 2006

(65) Prior Publication Data

US 2008/0086472 A1 Apr. 10, 2008

(51) Int. Cl.
*G06F 3/00* (2006.01)
(52) U.S. Cl. .................................... 707/781; 713/150
(58) Field of Classification Search ................ 707/9; 713/156, 150; 726/1–6, 26–30
See application file for complete search history.

(56) References Cited

U.S. PATENT DOCUMENTS

| | | | | |
|---|---|---|---|---|
| 5,740,248 A * | 4/1998 | Fieres et al. | ................. | 713/156 |
| 5,764,949 A * | 6/1998 | Huang et al. | ................. | 707/102 |
| 6,144,959 A * | 11/2000 | Anderson et al. | ............. | 707/9 |
| 6,158,010 A * | 12/2000 | Moriconi et al. | ................ | 726/1 |
| 6,292,810 B1 | 9/2001 | Richards | | |
| 6,446,092 B1 * | 9/2002 | Sutter | ......................... | 707/203 |
| 6,687,831 B1 * | 2/2004 | Albaugh et al. | ................. | 726/7 |
| 6,792,113 B1 * | 9/2004 | Ansell et al. | ................. | 380/284 |
| 6,859,879 B2 * | 2/2005 | Henn et al. | ..................... | 726/1 |
| 7,360,078 B1 * | 4/2008 | Lebouill | ..................... | 713/155 |
| 7,428,752 B2 * | 9/2008 | Rutherglen et al. | ........... | 726/12 |
| 2003/0033517 A1 * | 2/2003 | Rutherglen et al. | ......... | 713/153 |
| 2004/0141616 A1 | 7/2004 | Himmel et al. | | |
| 2005/0005261 A1 | 1/2005 | Severin | | |
| 2005/0108521 A1 * | 5/2005 | Silhavy et al. | .............. | 713/156 |
| 2005/0198490 A1 * | 9/2005 | Jaganathan et al. | ......... | 713/151 |
| 2005/0257051 A1 | 11/2005 | Richard | | |
| 2005/0278270 A1 | 12/2005 | Carr et al. | | |
| 2005/0289511 A1 | 12/2005 | Tucker et al. | | |
| 2010/0024038 A1 * | 1/2010 | Bandaram et al. | ............. | 726/26 |

* cited by examiner

*Primary Examiner*—Tim T. Vo
*Assistant Examiner*—Gary Koo
(74) *Attorney, Agent, or Firm*—Elissa Wang, SVL IP Law (57) ABSTRACT

A method for connecting a client to a database server are provided. The method provide for providing a generic interface, the generic interface being operable to interoperate with one or more non-GSSAPI (Generic Security Services Application Programming Interface) compliant security mechanisms, providing a set of specialized interfaces, the set of specialized interface being operable to interoperate with one or more GSSAPI compliant security mechanisms, and establishing a connection between a client and a database server using the generic interface or the set of specialized interfaces depending on a security mechanism used by the client. The one or more non-GSSAPI compliant security mechanisms and the one or more GSSAPI compliant security mechanisms may be predefined or user-defined.

30 Claims, 7 Drawing Sheets

SUPPORTING MULTIPLE SECURITY MECHANISMS IN A DATABASE DRIVER

FIELD OF THE INVENTION

The present invention relates generally to database drivers. More particularly, the present invention is directed to support of multiple security mechanisms in a database driver.

BACKGROUND OF THE INVENTION

Database drivers are software modules that enable clients (e.g., applications) to communicate with database servers (e.g., database management systems). Typically, a security mechanism is used to ensure communication between a client and a database server is secure. A variety of predefined security mechanisms are currently available, ranging from simple user identification and password checking to complex Kerberos authentication.

Multiple types of security mechanisms are usually supported by a database server for authenticating clients seeking to communicate with the database server. Since a database driver relies upon a security mechanism to obtain authorization from the database server before access can be granted to a client, the database driver must be able to interoperate with the security mechanism used by the client. However, it is not practical to include support for every type of security mechanism that may be used by a client in the database driver.

In addition, some clients may want to use a user-defined security mechanism rather than a predefined security mechanism. Although some database servers provide the flexibility to plug in user-defined security mechanisms, database drivers presently do not have the necessary interoperability with user-defined security mechanisms.

Accordingly, there is a need to provide support for multiple security mechanisms in database drivers.

SUMMARY OF THE INVENTION

A method for connecting a client to a database server are provided. The database driver includes a generic interface operable to interoperate with one or more non-GSSAPI (Generic Security Services Application Programming Interface) compliant security mechanisms and a set of specialized interfaces operable to interoperate with one or more GSSAPI compliant security mechanisms. The database driver is operable to establish a connection between the client and the database server using the generic interface or the set of specialized interfaces depending on a security mechanism used by the client. The security mechanism used by the client is operable to ensure the connection between the client and the database server is established in a secure manner.

In one embodiment, the database driver also includes a separate interface in communication with the generic interface and the set of specialized interfaces. The separate interface is operable to free up one or more system resources used to establish the connection between the client and the database server and to erase cryptographic information created to establish the connection between the client and the database server. The separate interface may be invoked in response to establishment of the connection between the client and the database server.

The generic interface is operable to retrieve security context information created in accordance with the security mechanism used by the client in an embodiment. In the embodiment, the security mechanism used by the client is one of the one or more non-GSSAPI compliant security mechanisms.

In an embodiment, the set of specialized interfaces includes a first interface operable to be utilized by the client to set a principal name in a security module created by the client to encapsulate the security mechanism used by the client, a second interface operable to retrieve the principal name set by the client from the security module, a third interface operable to be utilized by the client to set a credential in the security module, a fourth interface operable to retrieve the credential set by the client from the security module, and a fifth interface operable to retrieve a context from the security module. The context is created by the security module using a combination of the principal name and the credential set by the client. In the embodiment, the security mechanism used by the client is one of the one or more GSSAPI compliant security mechanisms. The database driver is operable to invoke the context to obtain security context information created in accordance with the security mechanism used by the client in one embodiment.

At least one of the one or more non-GSSAPI compliant security mechanisms is a user-defined security mechanism in one embodiment. In another embodiment, at least one of the one or more GSSAPI compliant security mechanisms is a user-defined security mechanism. The security mechanism used by the client is a user-defined security mechanism is an embodiment.

DETAILED DESCRIPTION

The present invention relates generally to database drivers and more particularly to support of multiple security mechanisms in a database driver. The following description is presented to enable one of ordinary skill in the art to make and use the invention and is provided in the context of a patent application and its requirements. Various modifications to the preferred implementations and the generic principles and features described herein will be readily apparent to those skilled in the art. Thus, the present invention is not intended to be limited to the implementations shown, but is to be accorded the widest scope consistent with the principles and features described herein.

In order to ensure that a connection between a client (e.g., an application) and a database server (e.g., a database management system (DBMS)) is established in a secure manner, a security mechanism may be used. Many predefined security mechanisms are available, such as Kerberos, Simple Public Key Mechanism (SPKM), and Low Infrastructure Public Key Mechanism (LIPKEY). Some of the predefined security mechanisms are compliant with the Generic Security Services Application Programming Interface (GSSAPI) standard and others are not. GSSAPI is an application programming interface for providing security services in a generic fashion that was developed by The Open Group.

When a database driver is used to facilitate communications between a client and a database server (e.g., establish connection, transfer data between the client and the database server, etc.), the database driver needs to support the various security mechanisms used by the client and the database server. Due to the number of security mechanisms currently available, it is not practical to include support for every type of security mechanism in the database driver. In addition, some clients and database servers may elect to utilize a user-defined security mechanism rather than a predefined security mechanism. Database drivers, however, do not presently support user-defined security mechanisms.

Figure 1:
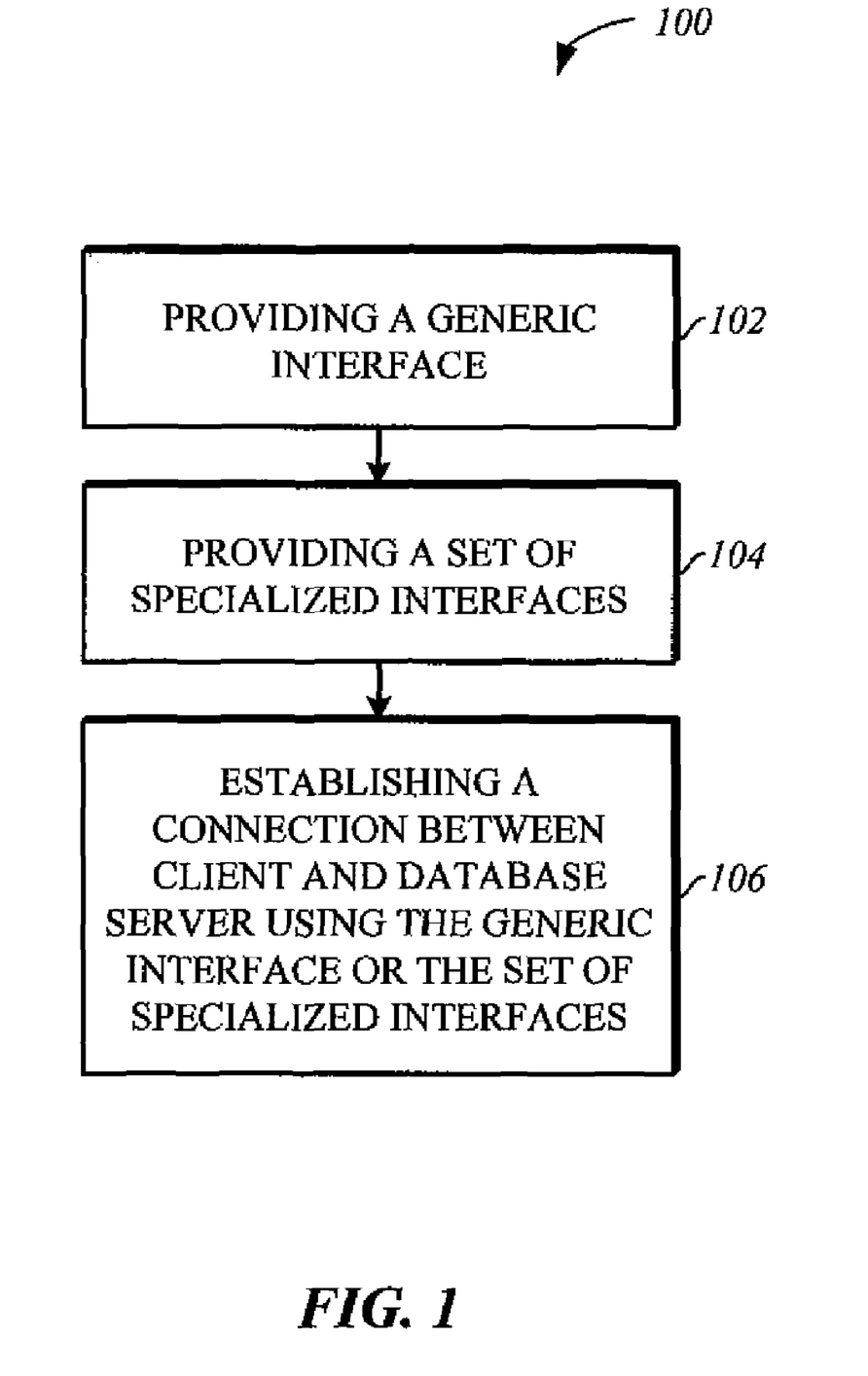
FIG. 1 is a flowchart of a method for connecting a client to a database server according to an embodiment of the invention.

Depicted in FIG. 1 is a process 100 for connecting a client to a database server through a database driver according to an embodiment of the invention. At 102, a generic interface is provided in the database driver. The generic interface is operable to interoperate with one or more non-GSSAPI (Generic Security Services Application Programming Interface) compliant security mechanisms. At 104, a set of specialized interfaces is provided in the database driver. The set of specialized interfaces is operable to interoperate with one or more GSSAPI compliant security mechanisms.

A connection between the client and the database server is then established using the generic interface or the set of specialized interfaces depending on a security mechanism used by the client (106). The security mechanism used by the client may be a user-defined or a predefined security mechanism. In addition, the security mechanism used by the client is operable to ensure the connection between the client and the database server is established in a secure manner. By including the generic interface and the set of specialized interfaces in the database driver, the database driver is able to interoperate with multiple security mechanisms, including GSSAPI compliant and non-GSSAPI compliant security mechanisms, as well as predefined and user-defined security mechanisms.

Figure 2:
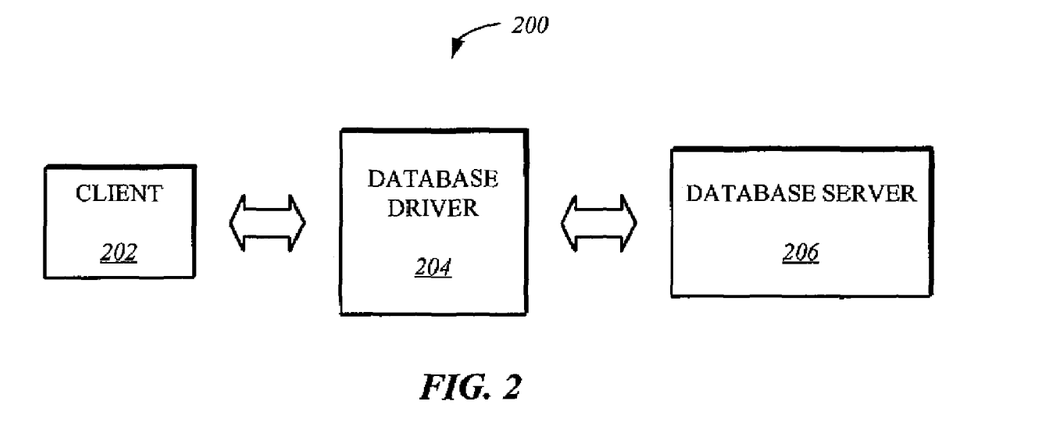
FIG. 2 illustrates a system for connecting a client to a database server in accordance with an embodiment of the invention.

FIG. 2 illustrates a system 200 in accordance with an embodiment of the invention. System 200 includes a client 202, a database driver 204, and a database server 206. Client 202 may be an application running on a computer and database server 206 may be a database management system (DBMS) running on another computer. In the embodiment, client 202 seeks to communicate with database server 206, which is facilitated by database driver 204. Database driver 204 may be running on the same computer as client 202, the same computer as database server 206, or on a completely different computer. Additionally, client 202 and database server 206 may be running on one computer while database driver 202 is running on another computer or all three may be running on the same computer.

Figure 3:
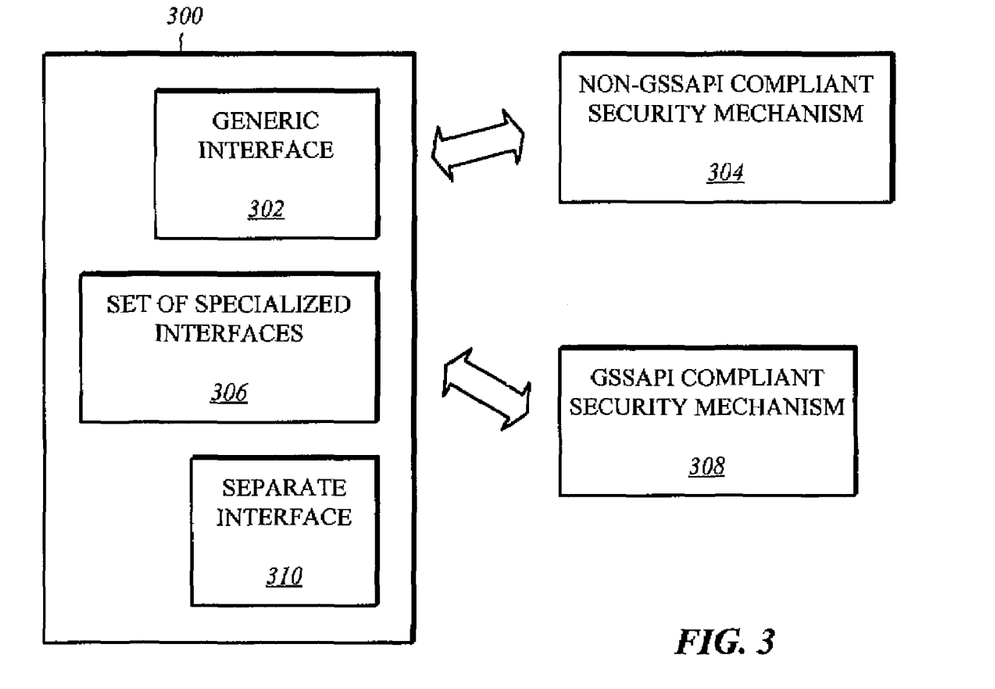
FIG. 3 depicts a database driver according to an embodiment of the invention.

Shown in FIG. 3 is a database driver 300 according to an embodiment of the invention. Database driver 300 includes a generic interface 302 that is operable to interoperate with a non-GSSAPI compliant security mechanism 304, a set of specialized interfaces 306 that is operable to interoperate with a GSSAPI compliant security mechanism 308, and a separate interface 310 that is operable to free up one or more system resources used to establish a connection between a client and a database server and to erase cryptographic information (e.g., tickets, keys, etc.) created to establish the connection between the client and the database server. In one embodiment, the separate interface is invoked in response to establishment of the connection between the client and the database server.

Non-GSSAPI compliant security mechanism 304 may be a user-defined or a predefined security mechanism and GSSAPI compliant security mechanism 308 may be a user-defined or a predefined security mechanism. Although only one non-GSSAPI compliant security mechanism 304 is shown in FIG. 3, generic interface 302 can interoperate with multiple non-GSSAPI compliant security mechanisms. In addition, even though the set of specialized interfaces 306 is shown as only interoperating with one GSSAPI compliant security mechanism 308 in FIG. 3, the set of specialized interfaces 306 can interoperate with other GSSAPI compliant security mechanisms.

Generic interface 302 is operable to retrieve security context information (e.g., user name and password, key, ticket, credential, etc.) created in accordance with the security mechanism used by the client in one embodiment. In the embodiment, the security mechanism used by the client is non-GSSAPI compliant security mechanism 304.

Figure 4:
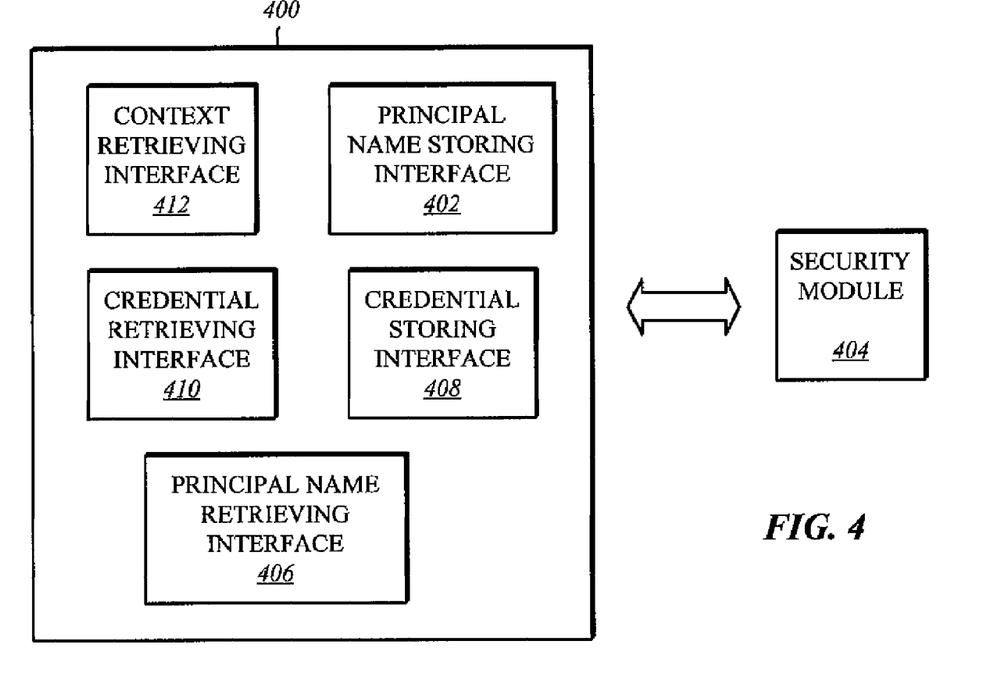
FIG. 4 shows a set of specialized interfaces in accordance with an embodiment of the invention.

FIG. 4 depicts a set of specialized interfaces 400 that is provided in a database driver in accordance with an embodiment of the invention. The set of specialized interfaces 400 includes a principal name storing interface 402 that is operable to be utilized by a client to set a principal name in a security module 404. Security module 404 is created by the client to encapsulate a security mechanism used by the client. In the embodiment, the security mechanism used by the client is a GSSAPI compliant security mechanism, such as GSSAPI compliant security mechanism 308. The principal name is a unique identifier needed for authentication with a database server.

A principal name retrieving interface 406 is also included in the set of specialized interfaces 400. Principal name retrieving interface 406 is operable to retrieve the principal name set by the client from security module 404. The set of specialized interfaces 400 further includes a credential storing interface 408, a credential retrieving interface 410, and a context retrieving interface 412. Credential storing interface 408 is operable to be utilized by the client to set a credential in security module 404. Credentials are used to verify the identity of the client and are sometimes referred to as tickets.

Credential retrieving interface 410 is operable to retrieve the credential set by the client from security module 404. Context retrieving interface 412 is operable to retrieve a context from security module 404. The context is created by security module 404 using a combination of the principal name and the credential set by the client. In one embodiment, the database driver is operable to invoke the context to obtain security context information created in accordance with the security mechanism used by the client.

Figure 5:
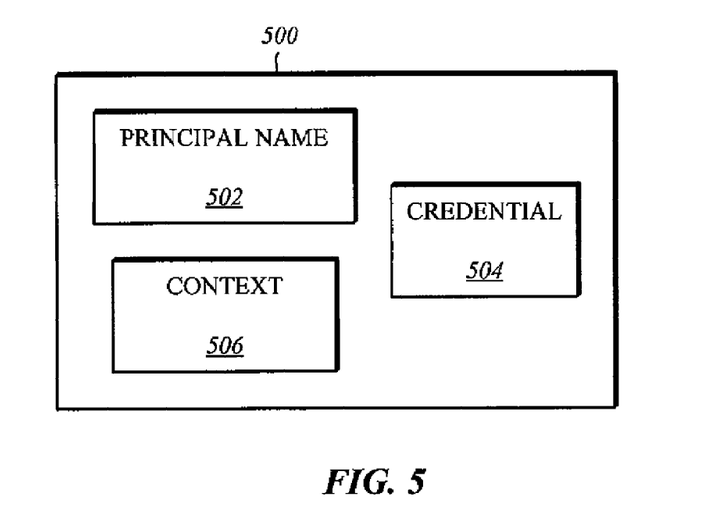
FIG. 5 illustrates a security module according to an embodiment of the invention.

Illustrated in FIG. 5 is a security module 500 created by a client according to an embodiment of the invention. Security module 500 includes a principal name 502, a credential 504, and a context 506. Additional information (not shown) may be included in security module 500 in other embodiments. Each security module may be unique to a particular client and/or a specific connection.

Figure 6A:
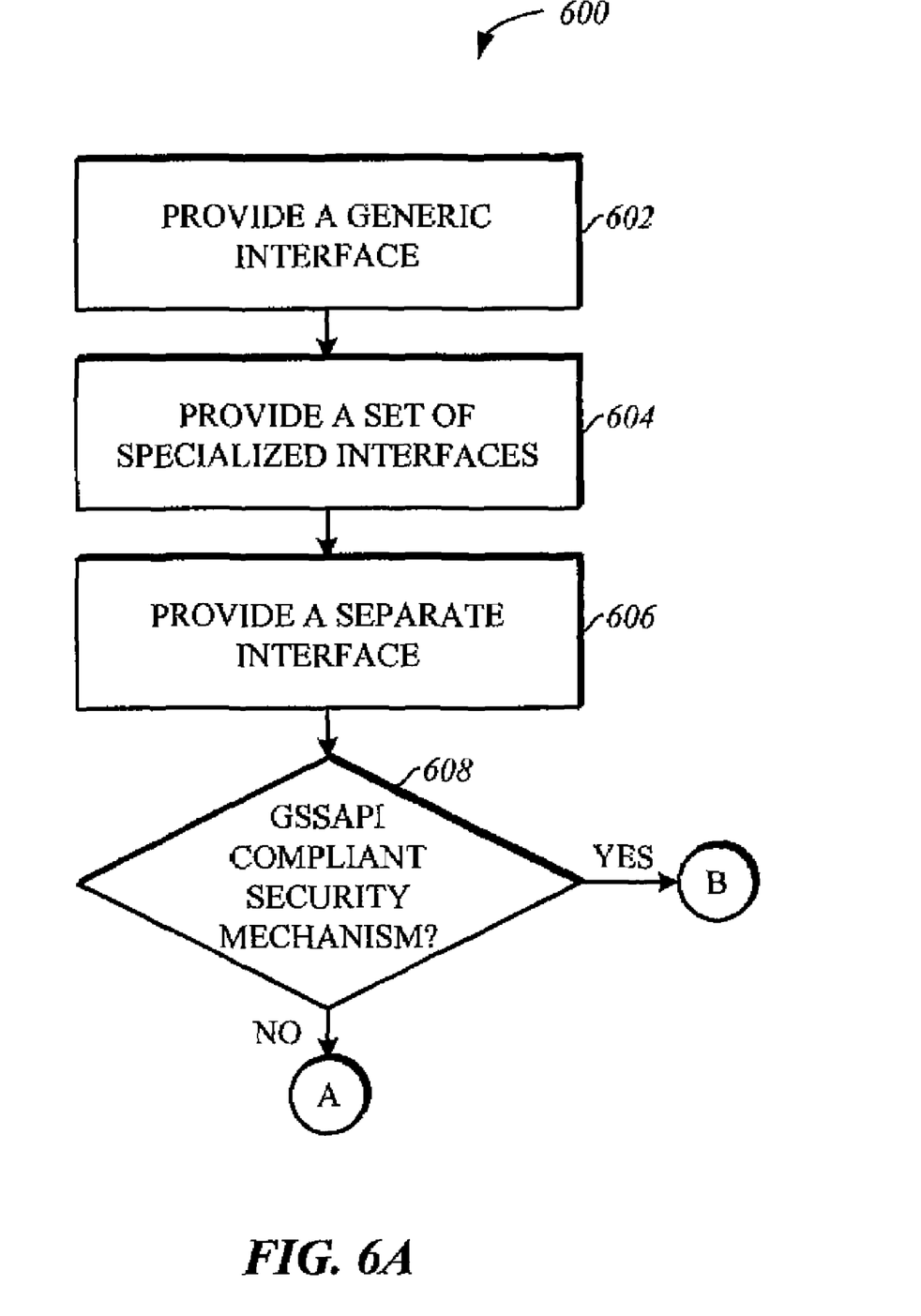
FIGS. 6A-6C is a process flow of a method for connecting a client to a database server in accordance with an embodiment of the invention.
Figure 6B:
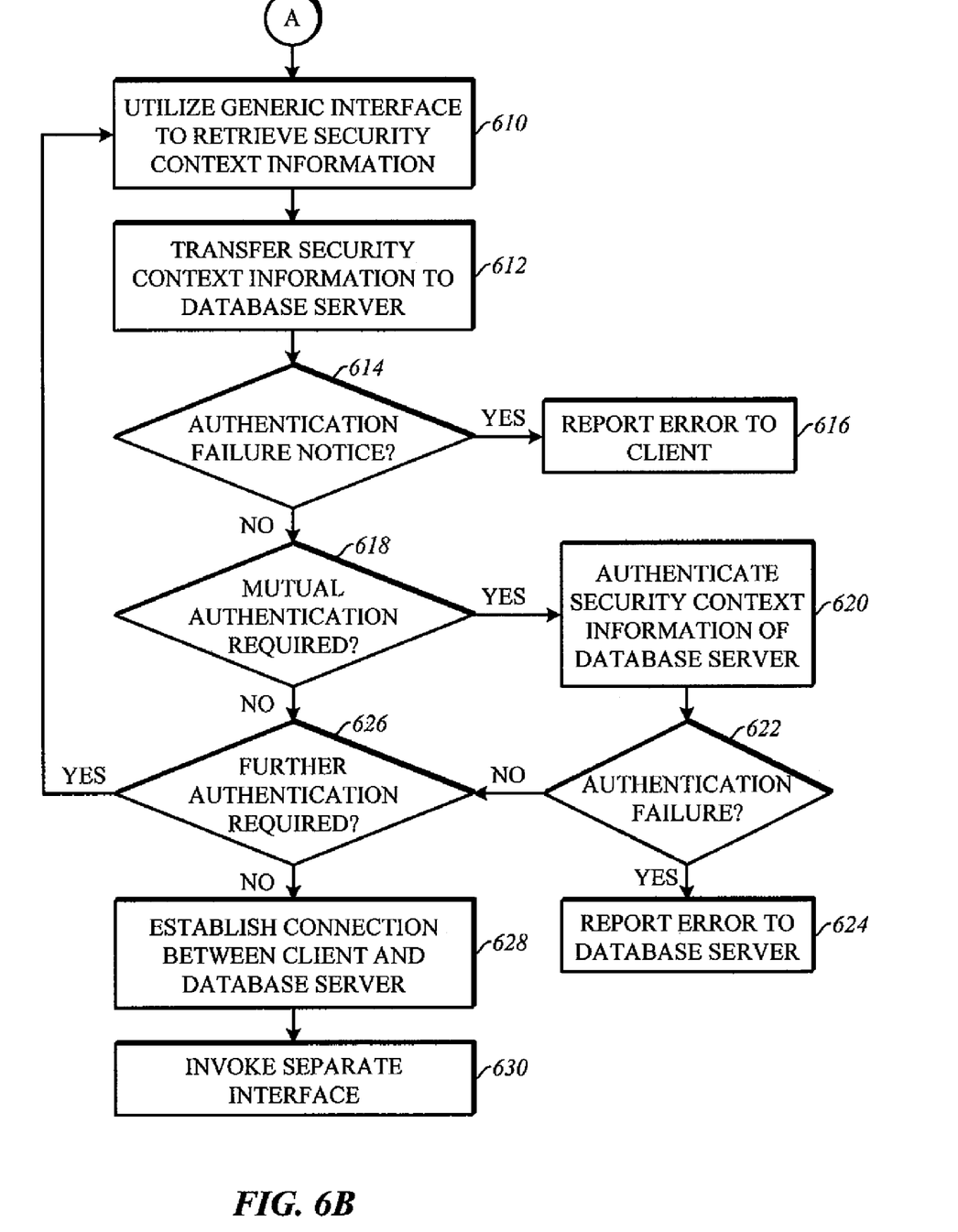
Figure 6C:
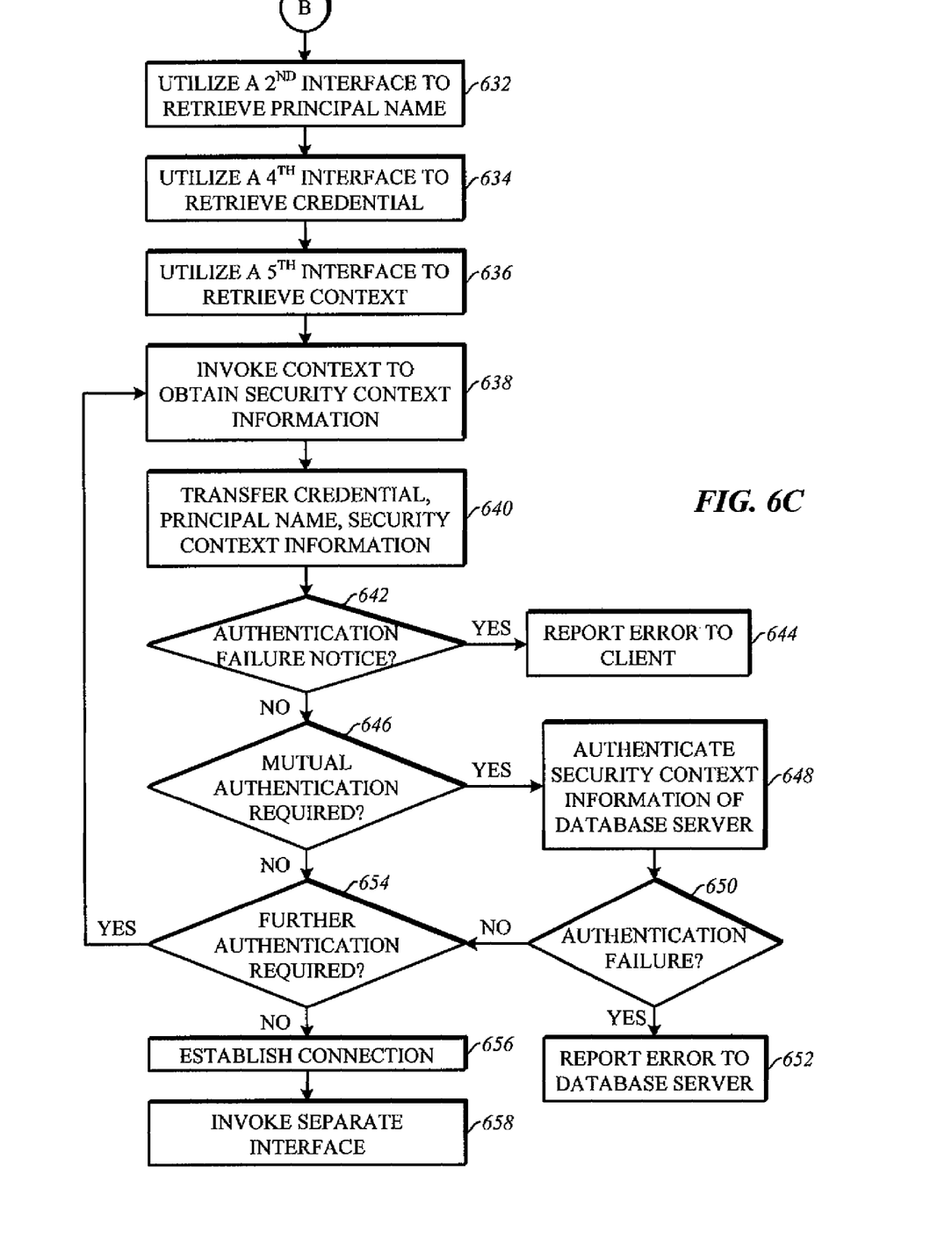

FIGS. 6A-6C show a process 600 for connecting a client to a database server through a database driver in accordance with an embodiment of the invention. A generic interface is provided in the database driver at 602, a set of specialized interfaces is provided in the database driver at 604, and a separate interface is provided in the database driver at 606. At

608, a determination is made as to whether a security mechanism used by the client is a GSSAPI compliant security mechanism.

If the security mechanism used by the client is not a GSSAPI compliant security mechanism, i.e., it is a non-GSSAPI compliant security mechanism, the generic interface is utilized to retrieve security context information created in accordance with the security mechanism used by the client at 610. At 612, the security context information is transferred to the database server. A determination is made at 614 as to whether an authentication failure notice has been received from the database server. An error is reported to the client at 616 responsive to receiving an authentication failure notice.

A determination is made at 618 as to whether mutual authentication is required when an authentication failure notice has not been received from the database server. If mutual authentication is required, security context information relating to the database server is authenticated at 620. At 622, a determination is made as to whether there has been an authentication failure with respect to the security context information relating to the database server. An error is reported to the database server at 624 responsive to authentication failure of the security context information relating to the database server.

When it is determined at 618 that mutual authentication is not required or it is determined at 622 that there has not been an authentication failure, a determination is made at 626 as to whether further authentication is required. If further authentication is required, process 600 returns to 610. If further authentication is not required, a connection between the client and the database server is established at 628 and the separate interface is invoked at 630 to free up one or more system resources used to establish the connection and to erase cryptographic information created to establish the connection.

If it is determined at 608 that the security mechanism used by the client is a GSS compliant security mechanism, a second interface in the set of specialized interfaces is utilized to retrieve a principal name from a security module at 632. The security module is created by the client to encapsulate the security mechanism used by the client and the principal name is set by the client in the security module using a first interface in the set of specialized interfaces.

At 634, a fourth interface in the set of specialized interfaces is utilized to retrieve a credential from the security module created by the client. The credential is set by the client in the security module using a third interface in the set of specialized interfaces. A fifth interface in the set of specialized interfaces is utilized to retrieve a context from the security module at 636. The context is created by the security module using a combination of the principal name and the credential set by the client.

The context is invoked at 638 to obtain security context information created in accordance with the security mechanism used by the client. The security context information, the principal name, and the credential are then transferred to the database server at 640. A determination is made at 642 as to whether an authentication failure notice has been received from the database server. If an authentication failure notice has been received, an error is reported to the client at 644.

If no authentication failure notice has been received, a determination is made at 646 as to whether mutual authentication is required. When mutual authentication is required, security context information relating to the database server is authenticated at 648. A determination is then made at 650 as to whether there has been an authentication failure. Error is reported to the database server at 652 if authentication of the security context information relating to the database server has failed.

A determination is made at 654 as to whether further authentication is required when it is determined at 646 that mutual authentication is not required or when it is determined at 650 that authentication of the security context information relating to the database server has not failed. Process 600 returns to 638 when further authentication is required. Otherwise, a connection between the client and the database server is established at 656 and the separate interface is invoked at 658.

The invention can take the form of an entirely hardware embodiment, an entirely software embodiment) or an embodiment containing both hardware and software elements. In one aspect, the invention is implemented in software, which includes, but is not limited to, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W).

Figure 7:
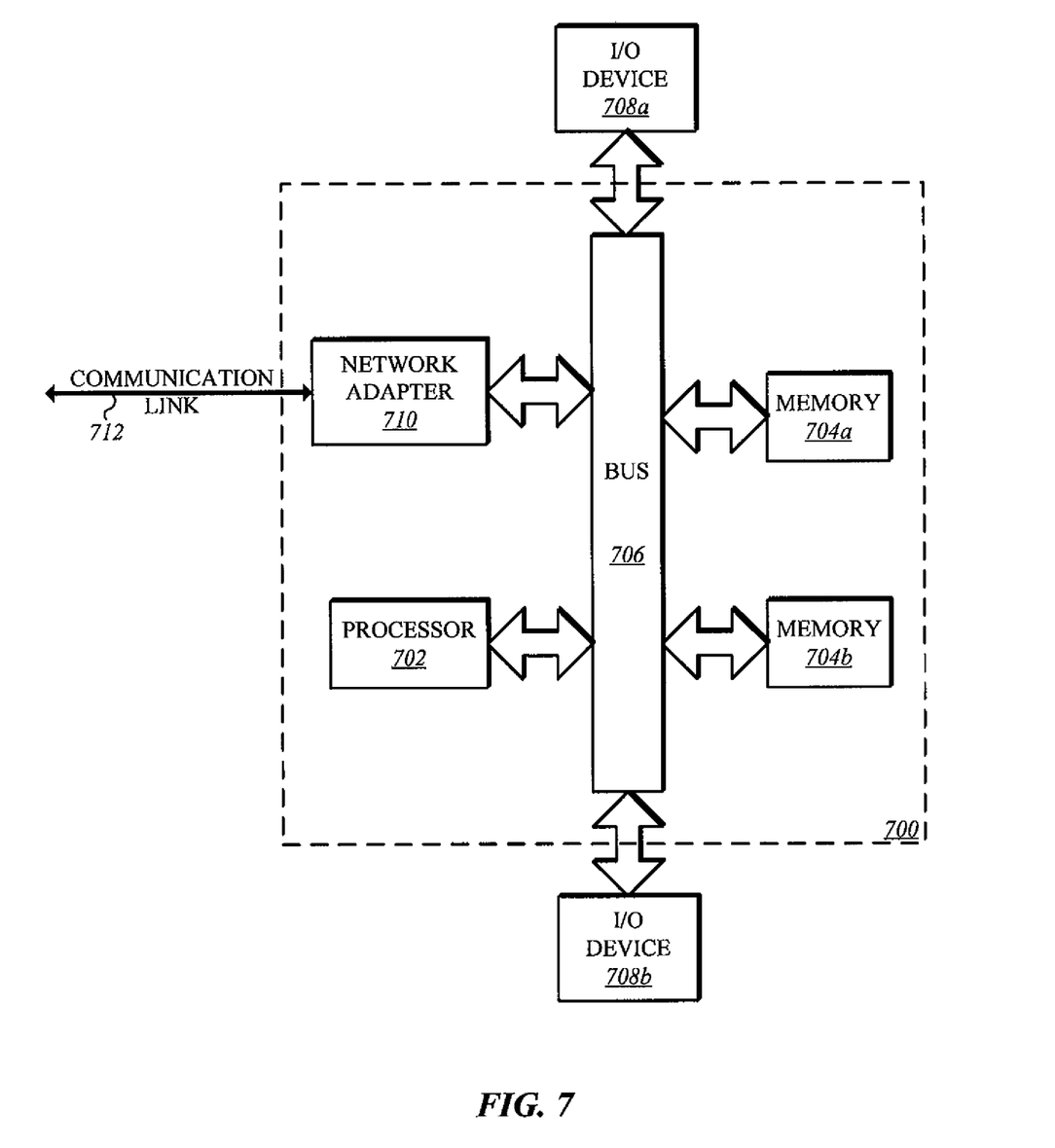
FIG. 7 depicts a block diagram of a data processing system with which embodiments of the present invention can be implemented.

FIG. 7 depicts a data processing system 700 suitable for storing and/or executing program code. Data processing system 700 includes a processor 702 coupled to memory elements 704*a-b* through a system bus 706. In other embodiments, data processing system 700 may include more than one processor and each processor may be coupled directly or indirectly to one or more memory elements through a system bus.

Memory elements 704*a-b* can include local memory employed during actual execution of the program code, bulk storage, and cache memories that provide temporary storage of at least some program code in order to reduce the number of times the code must be retrieved from bulk storage during execution. As shown, input/output or I/O devices 708*a-b* (including, but not limited to, keyboards, displays, pointing devices, etc.) are coupled to data processing system 700. I/O devices 708*a-b* may be coupled to data processing system 700 directly or indirectly through intervening I/O controllers (not shown).

In the embodiment, a network adapter 710 is coupled to data processing system 700 to enable data processing system 700 to become coupled to other data processing systems or remote printers or storage devices through communication link 712. Communication link 712 can be a private or public network. Modems, cable modems, and Ethernet cards are just a few of the currently available types of network adapters.

By providing the various interfaces in a database driver, a variety of security mechanisms are supported as the database driver is able to utilize the interfaces to retrieve security information that is then authenticated by a database server prior to establishing a connection. In addition, the database driver is able to leverage the interfaces to clean up resources used by the security mechanism after the connection is established. Thus, a polymorphic model that interoperates well with any predefined and user-defined security mechanism is provided.

Various implementations for connecting a client to a database server through a database driver have been described. Nevertheless, one of ordinary skill in the art will readily recognize that various modifications may be made to the implementations, and any variations would be within the spirit and scope of the present invention. For example, the above-described process flows are described with reference to a particular ordering of process actions. However, the ordering of many of the described process actions may be changed without affecting the scope or operation of the invention. Accordingly, many modifications may be made by one of ordinary skill in the art without departing from the spirit and scope of the following claims.

What is claimed is:

1. A method for enabling a database driver to interoperate with multiple types of security mechanisms and provide a connection between a client and a database server, wherein a plurality of different ones of said security mechanisms are used by said database server and one or more clients, and said security mechanisms include one or more security mechanisms created by a user for particular ones of clients and database servers, the method comprising:

providing a security interface in the database driver, wherein said security interface supports and interoperates with each of said plurality of security mechanisms used by said database server and said one or more clients including said security mechanisms created by said user for particular ones of clients and database servers, the security interface including:

a generic interface supporting and being operable to interoperate with each of said plurality of different security mechanisms that is non-compliant with an interface standard, wherein said non-compliant security mechanisms include at least one said security mechanism created by said user, and wherein said generic interface is further operable to retrieve security information created in response to authentication of a user by, and in accordance with, the security mechanism used by a corresponding client to facilitate connection with the database server; and a set of specialized interfaces, the set of specialized interfaces supporting and being operable to interoperate with each of said plurality of different security mechanisms that is compliant with said interface standard, wherein said compliant security mechanisms include at least one said security mechanism created by said user, and wherein the set of specialized interfaces are further operable to retrieve security information created in response to authentication of a user by, and in accordance with, the security mechanism used by a corresponding client to facilitate connection with the database server;

determining whether the security mechanism used by a client is compliant with said interface standard;

providing a connection between the client and the database server using the generic interface in response to the security mechanism used by the client being non-compliant with said interface standard and verification of the client based on the security information retrieved by the generic interface; and providing a connection between the client and the database server using the set of specialized interfaces in response to the security mechanism used by the client being compliant with said interface standard and verification of the client based on the security information retrieved by the set of specialized interfaces, wherein the security mechanism used by the client is operable to ensure the connection between the client and the database server is established in a secure manner.

2. The method of claim 1, further comprising:

providing a separate interface in the database driver, the separate interface being in communication with the generic interface and the set of specialized interfaces, wherein the separate interface is operable to:

free up one or more system resources used to establish the connection between the client and the database server; and erase cryptographic information created to establish the connection between the client and the database server.

3. The method of claim 2, further comprising:

invoking the separate interface in response to establishment of the connection between the client and the database server.

4. The method of claim 1, wherein providing a connection between the client and the database server using the generic interface comprises:

utilizing the generic interface to retrieve security context information created in accordance with the security mechanism used by the client, wherein the security mechanism used by the client is one of one or more non-GSSAPI compliant security mechanisms;

transferring the security context information to the database server; and establishing the connection between the client and the database server responsive to the security context information being authenticated by the database server.

5. The method of claim 4, further comprising:

reporting an error to the client responsive to receiving an authentication failure notice from the database server.

6. The method of claim 4, further comprising:

authenticating security context information relating to the database server responsive to mutual authentication being required; and reporting an error to the database server responsive to authentication failure.

7. The method of claim 1, wherein providing a connection between the client and the database server using the set of specialized interfaces comprises:

utilizing a second interface in the set of specialized interfaces to retrieve a principal name from a security module, the security module being created by the client to encapsulate the security mechanism used by the client, wherein the principal name is set by the client in the security module using a first interface in the set of specialized interfaces;

utilizing a fourth interface in the set of specialized interfaces to retrieve a credential from the security module, the credential being set by the client in the security module using a third interface in the set of specialized interfaces;

utilizing a fifth interface in the set of specialized interfaces to retrieve a context from the security module, the context being created by the security module using a combination of the principal name and the credential set by the client;

invoking the context to obtain security context information created in accordance with the security mechanism used by the client;

transferring the security context information, the principal name, and the credential to the database server; and establishing the connection between the client and the database server responsive to the security context information, the principal name, and the credential being authenticated by the database server, wherein the security mechanism used by the client is one of one or more GSSAPI compliant security mechanisms.

8. The method of claim 7, further comprising:
reporting an error to the client responsive to receiving an authentication failure notice from the database server.

9. The method of claim 7, further comprising:
authenticating security context information relating to the database server responsive to mutual authentication being required; and
reporting an error to the database server responsive to authentication failure.

10. The method of claim 1, wherein said security mechanisms non-compliant with said interface standard include one or more non-GSSAPI compliant security mechanisms.

11. The method of claim 1, wherein said security mechanisms compliant with said interface standard include one or more GSSAPI compliant security mechanisms.

12. A database driver implemented on a computer system to interoperate with multiple types of security mechanisms and provide a connection between a client and a database server, wherein a plurality of different ones of said security mechanisms are used by said database server and one or more clients, and said security mechanisms include one or more security mechanisms created by a user for particular ones of clients and database servers, the database driver comprising:

a security interface, wherein said security interface supports and interoperates with each of said plurality of security mechanisms used by said database server and said one or more clients including said security mechanisms created by said user for particular ones of clients and database servers, the security interface including:

a generic interface supporting and being operable to interoperate with each of said plurality of different security mechanisms that is non-compliant with an interface standard, wherein said non-compliant security mechanisms include at least one said security mechanism created by said user, and wherein said generic interface is further operable to retrieve security information created in response to authentication of a user by, and in accordance with, the security mechanism used by a corresponding client to facilitate connection with the database server; and a set of specialized interfaces, the set of specialized interfaces supporting and being operable to interoperate with each of said plurality of different security mechanisms that is compliant with said interface standard, wherein said compliant security mechanisms include at least one said security mechanism created by said user, and wherein the set of specialized interfaces are further operable to retrieve security information created in response to authentication of a user by, and in accordance with, the security mechanism used by a corresponding client to facilitate connection with the database server;

wherein the database driver is operable to determine whether the security mechanism used by a client is compliant with said interface standard and to provide a connection between the client and the database server using the generic interface in response to the security mechanism used by the client being non-compliant with said interface standard and verification of the client based on the security information retrieved by the generic interface;

wherein the database driver is operable to provide a connection between the client and the database server using the set of specialized interfaces in response to the security mechanism used by the client being compliant with said interface standard and verification of the client based on the security information retrieved by the set of specialized interfaces; and wherein the security mechanism used by the client is operable to ensure the connection between the client and the database server is established in a secure manner.

13. The database driver of claim 12, further comprising:
a separate interface in communication with the generic interface and the set of specialized interfaces, wherein the separate interface is operable to:
free up one or more system resources used to establish the connection between the client and the database server and erase cryptographic information created to establish the connection between the client and the database server.

14. The database driver of claim 13, wherein the separate interface is invoked in response to establishment of the connection between the client and the database server.

15. The database driver of claim 12, wherein the generic interface is operable to:
retrieve security context information created in accordance with the security mechanism used by the client, wherein the security mechanism used by the client is one of one or more non-GSSAPI compliant security mechanisms.

16. The database driver of claim 12, wherein the set of specialized interfaces comprises:
a first interface operable to be utilized by the client to set a principal name in a security module, the security module being created by the client to encapsulate the security mechanism used by the client;
a second interface operable to retrieve the principal name set by the client from the security module;
a third interface operable to be utilized by the client to set a credential in the security module;
a fourth interface operable to retrieve the credential set by the client from the security module;
a fifth interface operable to retrieve a context from the security module, the context being created by the security module using a combination of the principal name and the credential set by the client;
wherein the security mechanism used by the client is one of one or more GSSAPI compliant security mechanisms.

17. The database driver of claim 16, wherein the database driver is operable to invoke the context to obtain security context information created in accordance with the security mechanism used by the client.

18. The database driver of claim 12, wherein said security mechanisms non-compliant with said interface standard include one or more non-GSSAPI compliant security mechanisms.

19. The database driver of claim 12, wherein said security mechanisms compliant with said interface standard include one or more GSSAPI compliant security mechanisms.

20. A computer program product comprising a computer readable medium, the computer readable medium including a computer readable program for enabling a database driver to interoperate with multiple types of security mechanisms and provide a connection between a client and a database server, wherein a plurality of different ones of said security mechanisms are used by said database server and one or more clients, and said security mechanisms include one or more security mechanisms created by a user for particular ones of clients and database servers, and wherein the computer readable program when executed on a computer causes the computer to:

provide a security interface in the database driver, wherein said security interface supports and interoperates with each of said plurality of security mechanisms used by said database server and said one or more clients including said security mechanisms created by said user for particular ones of clients and database servers, the security interface including:

a generic interface supporting and being operable to interoperate with each of said plurality of different security mechanisms that is non-compliant with an interface standard, wherein said non-compliant security mechanisms include at least one said security mechanism created by said user, and wherein said generic interface is further operable to retrieve security information created in response to authentication of a user by, and in accordance with, the security mechanism used by a corresponding client to facilitate connection with the database server; and a set of specialized interfaces, the set of specialized interfaces supporting and being operable to interoperate with each of said plurality of different security mechanisms that is compliant with said interface standard, wherein said compliant security mechanisms include at least one said security mechanism created by said user, and wherein the set of specialized interfaces are further operable to retrieve security information created in response to authentication of a user by, and in accordance with, the security mechanism used by a corresponding client to facilitate connection with the database server;

determine whether the security mechanism used by a client is compliant with said interface standard;

provide a connection between the client and the database server using the generic interface in response to the security mechanism used by the client being non-compliant with said interface standard and verification of the client based on the security information retrieved by the generic interface; and provide a connection between the client and the database server using the set of specialized interfaces in response to the security mechanism used by the client being compliant with said interface standard and verification of the client based on the security information retrieved by the set of specialized interfaces, wherein the security mechanism used by the client is operable to ensure the connection between the client and the database server is established in a secure manner.

21. The computer program product of claim 20, wherein the computer readable program when executed on the computer further causes the computer to:

provide a separate interface in the database driver, the separate interface being in communication with the generic interface and the set of specialized interfaces, wherein the separate interface is operable to:

free up one or more system resources used to establish the connection between the client and the database server and erase cryptographic information created to establish the connection between the client and the database server.

22. The computer program product of claim 21, wherein the computer readable program when executed on the computer further causes the computer to:

invoke the separate interface in response to establishment of the connection between the client and the database server.

23. The computer program product of claim 20, wherein providing a connection between the client and the database server using the generic interface comprises:

utilizing the generic interface to retrieve security context information created in accordance with the security mechanism used by the client, wherein the security mechanism used by the client is one of one or more non-GSSAPI compliant security mechanisms;

transferring the security context information to the database server; and establishing the connection between the client and the database server responsive to the security context information being authenticated by the database server.

24. The computer program product of claim 23, wherein the computer readable program when executed on the computer further causes the computer to:

authenticate security context information relating to the database server responsive to mutual authentication being required; and report an error to the database server responsive to authentication failure.

25. The computer program product of claim 23, wherein the computer readable program when executed on the computer further causes the computer to:

report an error to the client responsive to receiving an authentication failure notice from the database server.

26. The computer program product of claim 20, wherein providing a connection between the client and the database server using the set of specialized interfaces comprises:

utilizing a second interface in the set of specialized interfaces to retrieve a principal name from a security module, the security module being created by the client to encapsulate the security mechanism used by the client, wherein the principal name is set by the client in the security module using a first interface in the set of specialized interfaces;

utilizing a fourth interface in the set of specialized interfaces to retrieve a credential from the security module, the credential being set by the client in the security module using a third interface in the set of specialized interfaces;

utilizing a fifth interface in the set of specialized interfaces to retrieve a context from the security module, the context being created by the security module using a combination of the principal name and the credential set by the client;

invoking the context to obtain security context information created in accordance with the security mechanism used by the client;

transferring the security context information, the principal name, and the credential to the database server; and establishing the connection between the client and the database server responsive to the security context information, the principal name, and the credential being authenticated by the database server, wherein the security mechanism used by the client is one of one or more GSSAPI compliant security mechanisms.

27. The computer program product of claim 26, wherein the computer readable program when executed on the computer further causes the computer to:

report an error to the client responsive to receiving an authentication failure notice from the database server.

28. The computer program product of claim 26, wherein the computer readable program when executed on the computer further causes the computer to:
   authenticate security context information relating to the database server responsive to mutual authentication being required; and
   report an error to the database server responsive to authentication failure.

29. The computer program product of claim 20, wherein said security mechanisms non-compliant with said interface standard include one or more non-GSSAPI compliant security mechanisms.

30. The computer program product of claim 20, wherein said security mechanisms compliant with said interface standard include one or more GSSAPI compliant security mechanisms.

* * * * *